US010627596B2

(12) United States Patent
Suzuki

(10) Patent No.: US 10,627,596 B2
(45) Date of Patent: Apr. 21, 2020

(54) LENS APPARATUS AND IMAGE PICKUP APPARATUS INCLUDING THE SAME

(71) Applicant: CANON KABUSHIKI KAISHA, Tokyo (JP)

(72) Inventor: Kazuto Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 15/378,155

(22) Filed: Dec. 14, 2016

(65) Prior Publication Data

US 2017/0184809 A1    Jun. 29, 2017

(30) Foreign Application Priority Data

Dec. 28, 2015   (JP) ................ 2015-256004

(51) Int. Cl.
*G02B 7/08* (2006.01)
*G05B 19/416* (2006.01)
*H02N 2/06* (2006.01)

(52) U.S. Cl.
CPC ............ *G02B 7/08* (2013.01); *G05B 19/416* (2013.01); *H02N 2/06* (2013.01); *G05B 2219/45179* (2013.01)

(58) Field of Classification Search
CPC . G02B 7/10; G02B 7/04; G02B 7/023; G02B 7/08; G02B 7/102; G02B 7/004; G02B 7/026; H02K 41/0356; G03F 7/70825; G05B 19/416; H02N 2/06; G11B 7/0929; G11B 7/0927; G11B 7/0908
See application file for complete search history.

(56) References Cited

U.S. PATENT DOCUMENTS 6,999,684 B2    2/2006   Sato et al.
7,616,387 B2   11/2009   Kokabu

FOREIGN PATENT DOCUMENTS

| JP | H02280579 A | 11/1990 |
|---|---|---|
| JP | H0933788 A | 2/1997 |
| JP | 2001224189 A | 8/2001 |
| JP | 2003066312 A | 3/2003 |
| JP | 2004109690 A | 4/2004 |
| JP | 2004192200 A | 7/2004 |
| JP | 2006350061 A | 12/2006 |
| JP | 2010085809 A | 4/2010 |
| JP | 2014228592 A | 12/2014 |

OTHER PUBLICATIONS

Office Action issued in Japanese Appln. No. 2015-256004 dated Jan. 8, 2019.

*Primary Examiner* — Alicia M Harrington
(74) *Attorney, Agent, or Firm* — Rossi, Kimms & McDowell LLP

(57) ABSTRACT

A lens apparatus includes: an optical member; a driver that drives the optical member; a position detector that detects a position of the optical member; a target position deriver that sets a target position to which to drive the optical member; a speed deriver that derives a target speed for the driver to drive the optical member based on a difference between the target position and the position of the optical member; and a controller that controls the driver. The controller controls driving of the driver such that a speed of the optical member is equal to the target speed.

7 Claims, 7 Drawing Sheets

LENS APPARATUS AND IMAGE PICKUP APPARATUS INCLUDING THE SAME

BACKGROUND OF THE INVENTION

Field of the Invention

The present invention relates to a lens apparatus, and particularly to a lens apparatus that drives a movable optical member by a driver and an image pickup apparatus including the same.

Description of the Related Art

A lens apparatus has difficulty in driving an optical member to a target position with high accuracy in some situations due to control factors such as an operation torque and a control gain and environmental factors such as an orientation difference of the lens apparatus and an ambient temperature. To deal with these situations, there have heretofore been proposed an apparatus that stores a convergence correction value and an apparatus that performs drive control with high accuracy using a special driver. For example, Japanese Patent Application Laid-Open No. 2004-192200 discloses a motor control apparatus that, when the power is turned on, drives an optical member, detects a positional deviation toward convergence on a target position, and evaluates the convergence based on the positional deviation. In addition, Japanese Patent Application Laid-Open No. 2003-66312 discloses a lens apparatus that includes two actuators as drivers, and stops an optical member at the focus point with high accuracy using a shape changing actuator capable of fine driving around the focus point.

However, the apparatus disclosed in Japanese Patent Application Laid-Open No. 2004-192200 cannot deal with a change in the shooting conditions, because the positional deviation used to evaluate the convergence of a stop position on a target position is dependent only on the orientation difference and the temperature condition at the moment of the calculation of the evaluation value In the meantime, the apparatus disclosed in Japanese Patent Application Laid-Open No. 2003-66312 needs to be provided with two actuators, which might be a factor that imposes constraints on the driver of the lens apparatus.

SUMMARY OF THE INVENTION

In view of the above problems, an object of the present invention is to provide a lens apparatus which causes a driver to drive an optical member and which includes a drive controller that enables the driver to drive the optical member to a target position with high accuracy without imposing constraints onto the initialization operation and the driver.

To attain the above object, a lens apparatus according to the present invention includes: an optical member; a driver that drives the optical member; a position detector that detects a position of the optical member; a target position deriver that sets a target position to which to drive the optical member; a speed deriver that derives a target speed for the driver to drive the optical member based on a difference between the target position and the position of the optical member; and a controller that controls the driver. The controller controls driving of the driver such that a speed of the optical member is equal to the target speed. When the difference between the position and the target position is equal to or smaller than a first threshold and larger than a second threshold, the target speed derived by the speed deriver becomes lower as the difference becomes smaller, and when the difference is equal to or smaller than the second threshold, the target speed is a value with which to maintain the position of the optical member.

According to the present invention, it is possible to provide a lens apparatus which causes a driver to drive an optical member, the lens apparatus including a drive controller that enables the driver to drive the optical member to a target position with high accuracy without imposing constraints onto the initialization operation and the driver, and an image pickup apparatus with the same.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[First Embodiment]

Hereinafter, referring to FIGS. 1 to 7, descriptions will be provided for a lens apparatus according to a first embodiment of the present invention.

Figure 1:
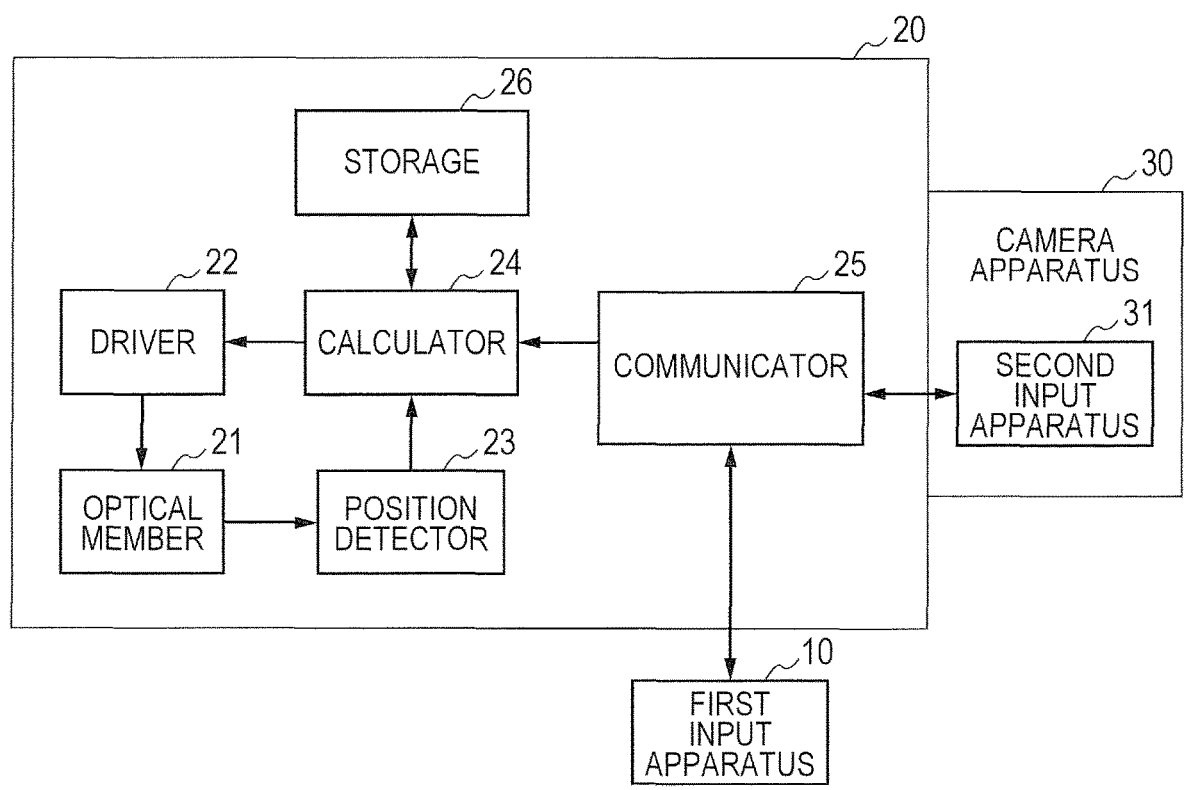
FIG. 1 is a block diagram of the present invention.

FIG. 1 is a block diagram illustrating a configuration of an embodiment of the present invention, and an embodiment of a configuration for drive control of an optical member of the lens apparatus.

A first input apparatus 10 is a controller or the like, which is connected to a lens apparatus 20 and transmits information on a target position to which to drive an optical member 21. The lens apparatus 20 includes the optical member 21, a driver 22, a position detector 23, a calculator (speed deriver) 24, a communicator 25, and a storage 26. The lens apparatus 20 constitutes an image pickup apparatus by being connected to an image pickup element (not illustrated) configured to receive light of a subject image formed by the lens apparatus and a camera apparatus 30 including a second input apparatus 31 such as operation buttons. The second input apparatus 31 transmits information on the target position to which the optical member 21 of the connected lens apparatus 20 is driven, in the same way as the first input apparatus does. In this embodiment, the optical member 21 is a focus lens for adjusting a focus position. The optical member 21 is connected to the driver 22 and the position detector 23. This structure makes it possible for the driver 22 to drive the optical member 21 and for the position detector 23 to detect the present position of the optical member 21. The driver 22 is an actuator such as a motor.

The calculator 24 is a CPU of the lens apparatus 20. The calculator 24 is connected to the communicator 25 and the storage 26. This structure makes it possible for the calculator (target position deriver) 24 to receive a drive command from the first input apparatus 10 or the second input apparatus 31 through the communicator 25 and derive the target position to which to drive the optical member 21. The derived target position is stored in the storage 26. The calculator 24 is also connected to the driver 22 and the position detector 23. The structure makes it possible for the calculator 24 to calculate an output value for the driver 22 based on the target position stored in the storage 26 and the present position of the optical member 21 transmitted from the position detector 23, and transmit the output value to the driver 22. Note that the output value calculation process is performed at every constant drive cycle in which the driver 22 can control the optical member 21 with high responsivity. In addition, the calculator 24 stores the output value in the storage 26 at every drive cycle. The output value that was stored at the last drive cycle is overwritten and the latest output value remains in the storage 26.

In this embodiment, the communicator 25 is a communication unit including electrical contacts. The storage 26 is a memory, where the target position and the output value for the driver 22 are stored.

Figure 2:
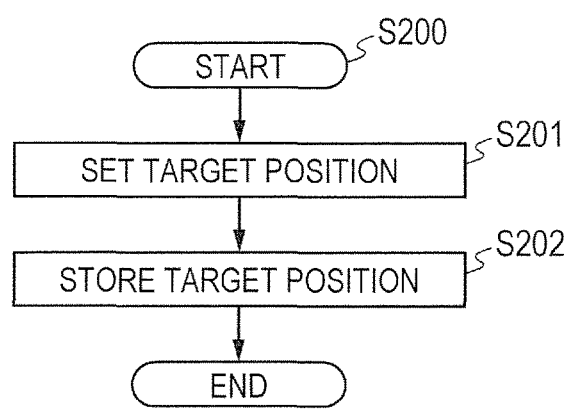
FIG. 2 is a flowchart for setting a target position.

Next, descriptions will be provided for setting of the target position by the calculator 24, using a flowchart. FIG. 2 is a flowchart for setting the target position by the calculator 24 in the first embodiment. The setting of the target position is started when the drive command is transmitted from the first input apparatus 10 or the second input apparatus 31.

At S200, the calculator 24 receives the drive command transmitted from the first input apparatus 10 or the second input apparatus 31, via the communicator 25. After the reception is completed, the process proceeds to S201. The drive command will be described later.

At S201, the calculator (target position deriver) 24 calculates (derives) the target position to which to drive the optical member 21 based on the drive command. After the target position calculation is completed, the process proceeds to S202.

At S202, the calculator 24 stores the target position calculated at S201 in the storage 26. When the storage of the target position is completed, the target position setting is terminated.

As described above, the calculator 24 can set the target position to which to drive the optical member 21 when receiving the drive command from the first input apparatus 10 or the second input apparatus 31. The drive commands include one that specifies a relative position from the present position and one that specifies an absolute position, and are not particularly limited thereto. In addition, the method of calculating the target position at S201 is also not particularly limited.

Figure 3:
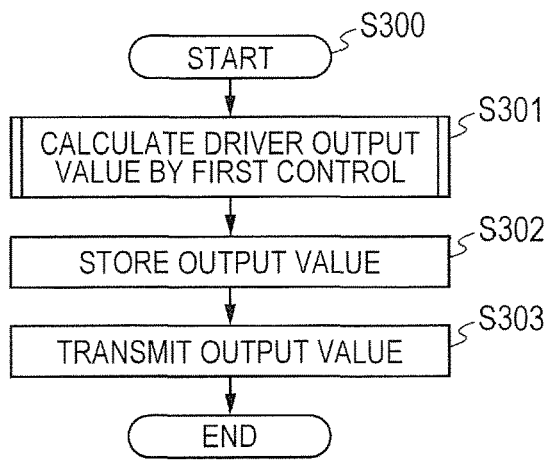
FIG. 3 is a flowchart for one drive cycle in a first embodiment.

Next, using a flowchart, descriptions will be provided for the calculation process of the output value for the driver 22 that the calculator 24 performs at every constant drive cycle. FIG. 3 is a flowchart illustrating a process for one drive cycle that the calculator 24 performs in the first embodiment.

At S300, the calculator 24 starts the process at every drive cycle, and proceeds to S301.

At S301, the calculator 24 calculates an output value for the driver 22 in a first control. A method of calculating the output value in the first control will be described in detail later. After the output value calculation is completed, the process proceeds to S302.

At S302, the calculator 24 stores the output value calculated at S303 in the storage 26. After the output value storage is completed, the process proceeds to S303.

The calculator 24 transmits the output value calculated at S301 to the driver 22 at S303, and then terminates the process.

By doing the above process, the calculator 24 calculates the output value for the driver 22 at every constant drive cycle. The driver 22 can perform driving based on the transmitted output value. Here, only the output value for the latest drive cycle is stored in the storage 26, and the output value for the last drive cycle is overwritten with the output value for the latest drive cycle.

Figure 4:
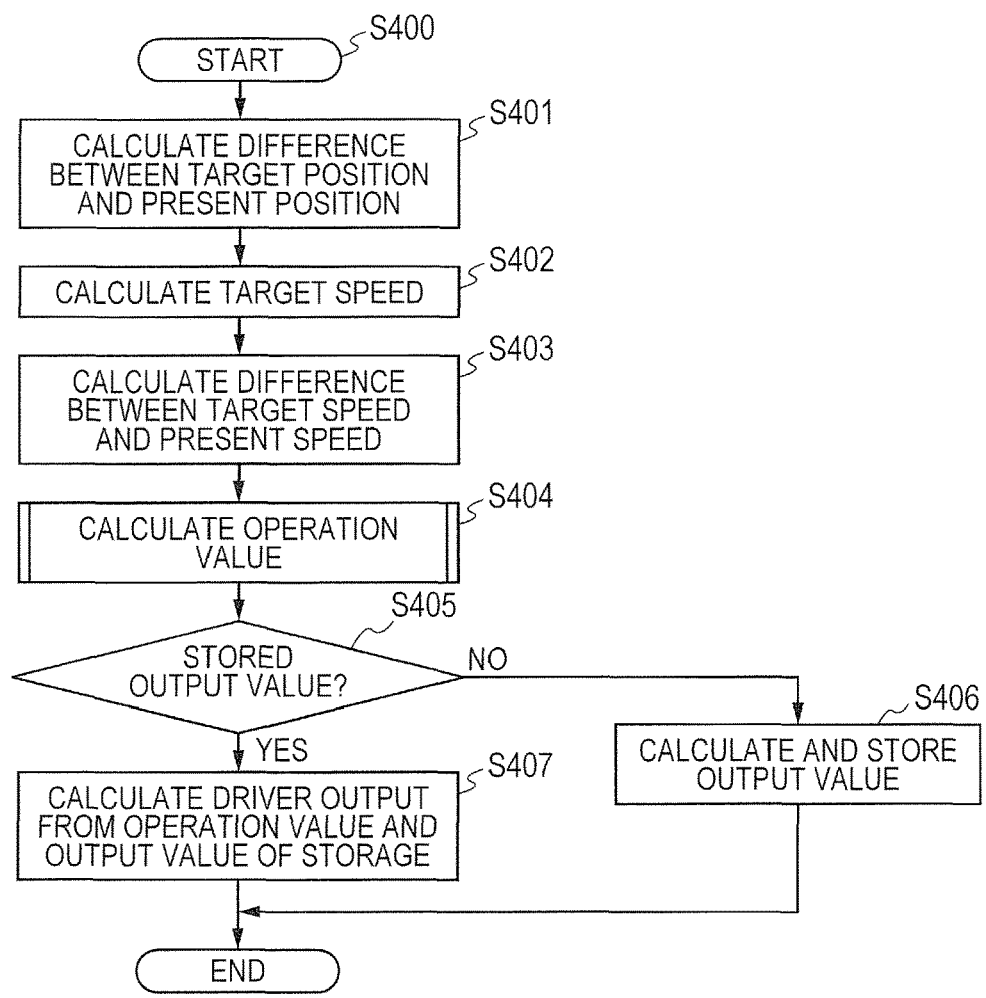
FIG. 4 is a flowchart of a first control.

Next, using a flowchart, descriptions will be provided for a method of calculating the output value for the driver 22 in the first control performed by the calculator 24 at S301 in FIG. 3. FIG. 4 is a flowchart illustrating the process that the calculator 24 performs to calculate the output value for the driver 22 in the first control.

When the process proceeds to S301 in FIG. 3, the processing starts at S400, and the process proceeds to S401.

At S401, the calculator 24 calculates the difference between the target position stored in the storage 26 at S202 in FIG. 2 and the present position of the optical member 21 detected by the position detector 23. After the calculation is completed, the process proceeds to S402.

At S402, the calculator (speed deriver) 24 calculates a target speed from the difference between the target position calculated at S401 and the present position. The target speed will be described in detail later. After the target speed calculation is completed, the process proceeds to S403.

At S403, the calculator 24 calculates the difference between the target speed calculated at S402 and the present speed of the optical member. After the difference calculation is completed, the process proceeds to S404.

At S404, the calculator 24 calculates the amount of correction for the output value based on the difference calculated at S402. After the calculation of the amount of correction is completed, the process proceeds to S405. The calculation of the amount of correction will be described later.

At S405, the calculator 24 checks if an output value is stored in the storage 26. If an output value is not stored, the process proceeds to S406, and if it is stored, the process proceeds to S407.

At S406, the calculator 24 calculates the output value for the driver 22 based on the target position stored in the storage 26 and the present position of the optical member 21 transmitted from the position detector 23, and stores the output value in the storage 26. If the process proceeds to S406, the calculation of the output value for the driver 22 in the first control is terminated here.

At S407, the calculator 24 calculates a driver output value from the amount of correction calculated at S404 and the output value stored in the storage 26. The calculation method will be described later. Here, the calculation of the output value for the driver 22 in the first control is terminated.

The above process makes it possible to drive the optical member 21 to the target position with high accuracy by the calculator 24 calculating the target speed, manipulating the driver output value for the last drive cycle, and calculating the driver output value.

Here, the target speed will be described. The target speed calculated at S402 becomes higher as the optical member 21 becomes farther away from the target position, and when the difference between the target position and the present position is 0, the target speed is 0. In other words, as the difference between the present position and the target position becomes smaller, the target speed derived by the calculator 24 (speed deriver) is set lower. As a result, since the target speed does not become 0 until the optical member 21 reaches the target position, it is possible to drive the optical member 21 to the target position without stopping by manipulating the output value such that the speed of the optical member 21 becomes equal to the target speed.

Next, the calculation of the amount of correction will be described. The amount of correction C calculated at S404 can be obtained with the following formula:

$$C=(V1-V2)\times G,$$

where V1 is the target speed, V2 is the present speed, and G is a gain. In other words, the amount of correction C is derived as a value proportional to the difference between the target speed V1 and the present speed V2. When the target speed is higher than the present speed, the amount of correction C is a positive value, and when the target speed is lower than the present speed, the amount of correction C is a negative value.

Next, a method of calculating the output value will be described. At S407, the relationship in the following formula holds true:

$$O(n)=O(n-1)+C(n),$$

where O(n) is the driver output value at the n-th cycle, and C(n) is the amount of correction at the n-th cycle. By correcting and updating the output value by the amount of correction with the above formula at every cycle, it is possible to drive the optical member 21 at the target speed.

Here, in the first control, the output value of the last drive cycle is used. However, at the first drive cycle, an output value is not stored in the storage 26. Then, by performing calculation and storage at S406, it is possible to catch up with the target speed quickly. In this embodiment, the output value is calculated using the following formula:

$$O=(P1-P2)\times G,$$

where O is the output value, P1 is the target position, P2 is the present position, and G is the gain. In other words, the output value O is derived as a value proportional to the difference between the target position P1 and the present position P2. Although the output value O is calculated as described above in this embodiment, the output value O may be obtained with another method.

Figure 5:
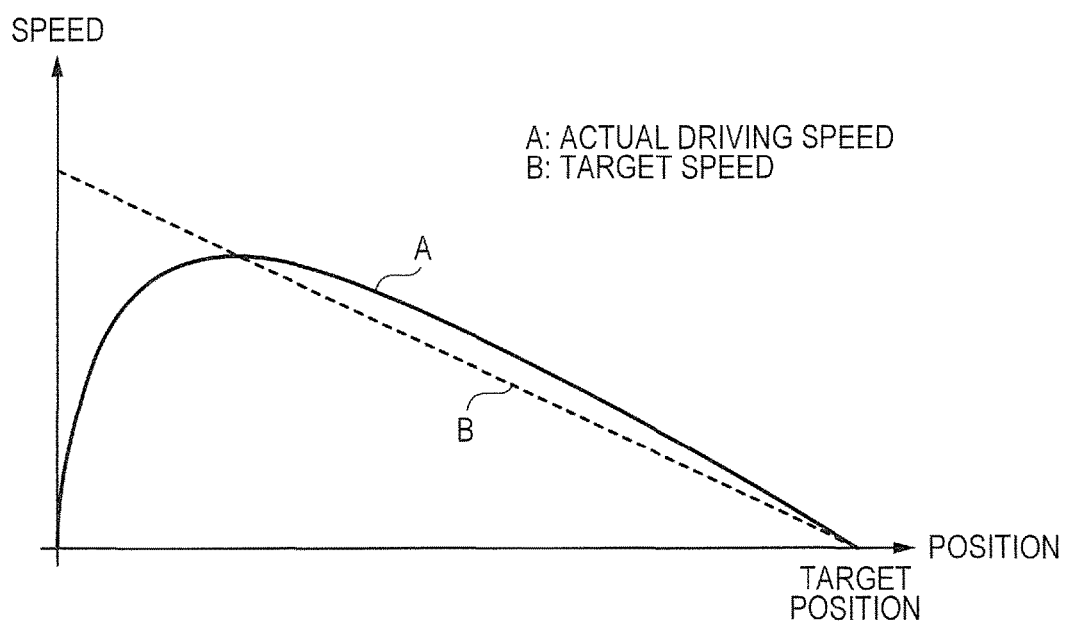
FIG. 5 is a graph for an ideal first control when a target speed is higher than the present speed.
Figure 6:
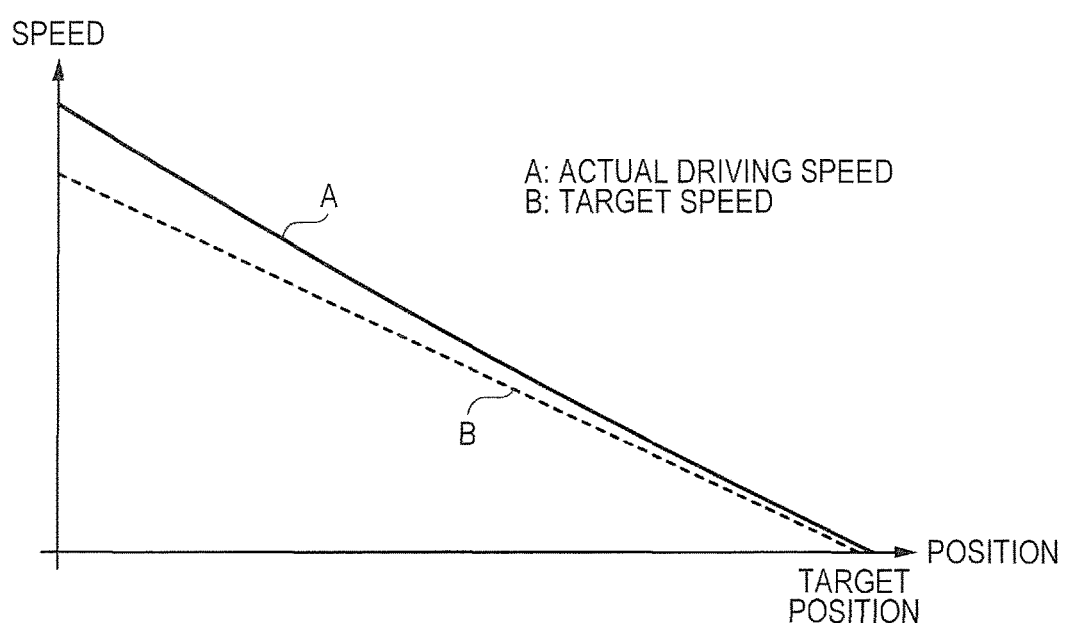
FIG. 6 is a graph for an ideal first control when the target speed is lower than the present speed.

Next, advantageous effects of this embodiment will be described. FIGS. 5 and 6 illustrate ideal relationships between the target speed and the present speed when the first control is performed. FIG. 5 illustrates a case where the target speed is higher than the present speed at the early stage of driving. FIG. 6 illustrates a case where the target speed is lower than the present speed at the early stage of driving. In an ideal condition, the present speed follows the target speed at a speed slightly higher than the target speed.

Figure 7:
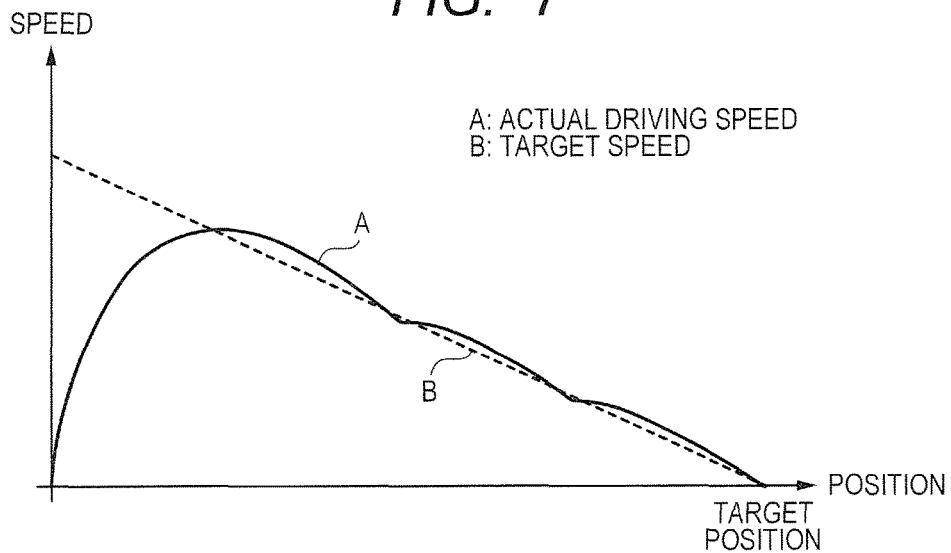
FIG. 7 is a graph for the first control when there is disturbance.

FIG. 7 illustrates a relationship between the target speed and the present speed when the driving is performed using the first control in a condition where a decrease in speed occurs due to the torque and the orientation difference. The calculator 24 makes a correction to make the output value larger as soon as the present speed falls below the target speed due to a speed drop caused by disturbance. As a result, the present speed goes up above the target speed at once, and the follows the target speed again at a speed slightly higher than the target speed.

In the meantime, the target speed becomes 0 at the target position as illustrated in FIGS. 5 and 6, and the output value is manipulated such that the present speed becomes 0 at the target position. Accordingly, at the target position, the present speed becomes 0, and the optical member 21 can stop.

Although the optical member 21 is a focus lens in this embodiment, the invention is not limited thereto and may be applied to drive control of a zoom lens for adjusting a focal length and aperture blades for adjusting the amount of light. In addition, the communicator 25 may be a wireless communicator without electrical contacts.

The above operation makes it possible to provide the lens apparatus including the drive controller which enables the driver to drive the optical member to the target position with high accuracy without imposing constraints onto the initialization operation and the driver in ideal conditions for the control system in this embodiment.

According to the present invention, it is possible to provide the lens apparatus which causes the driver to drive the optical member, the lens apparatus including the drive controller that enables the driver to drive the optical member to the target position with high accuracy without imposing constraints onto the initialization operation and the driver.

[Second Embodiment]

Hereinafter, referring to FIGS. 1 to 11, a lens apparatus according to a second embodiment of the present invention will be described. The same functions and structures as in the first embodiment are denoted by the same reference numerals, and descriptions thereof are omitted. The block diagram of the lens apparatus of this embodiment has the same structure as that of the first embodiment illustrated in FIG. 1. In addition, the flowchart of the setting of the target position performed by the calculator 24 of the lens apparatus 20 in this embodiment is the same as that in the first embodiment illustrated in FIG. 2.

Figure 8:
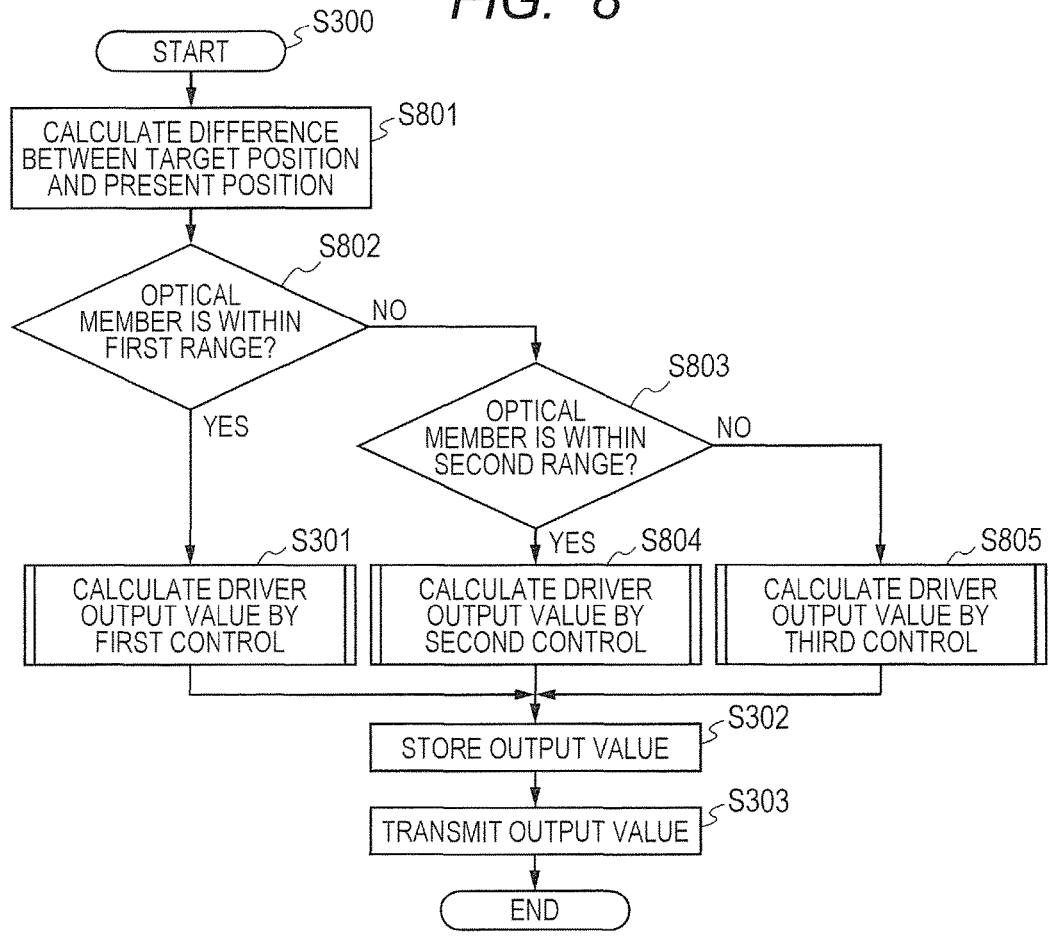
FIG. 8 is a flowchart for one drive cycle of a second embodiment.

Referring to FIG. 8, descriptions will be provided for a flowchart for one drive cycle performed by the calculator 24 in the second embodiment.

The calculator 24 starts the process at S300 at every drive cycle and proceeds to S801.

At S801, the calculator 24 calculates the difference between the target position stored in the storage 26 and the present position of the optical member 21 detected by the position detector 23. After the calculation, the process proceeds to S802.

At S802, the calculator 24 detects the present position of the optical member 21 and determines whether the present position is within a first range. If the optical member 21 is within the first range, the process proceeds to S301, and if not, the process proceeds to S803.

At S803, the calculator 24 detects the present position of the optical member 21 and determines whether the present position is within a second range. If the optical member 21 is within the second range, the process proceeds to S804, and if not, the optical member 21 is determined to be within the third range and the process proceeds to S805. The ranges will be described later.

At S804, the calculator 24 calculates a driver output value in a second control. The second control will be described later. After the output value calculation, the process proceeds to S302.

At S805, the calculator 24 calculates the driver output value in a third control. The third control will be described later. After the output value calculation, the process proceeds to S302.

The first control at 301 has the same contents as described in FIGS. 4 to 7 of the first embodiment, and descriptions thereof are omitted. In addition, S302 and S303 also have the same contents as described in FIG. 3 of the first embodiment, and descriptions thereof are omitted.

As described above, the control is switched in accordance with the present position of the optical member 21.

Figure 9:
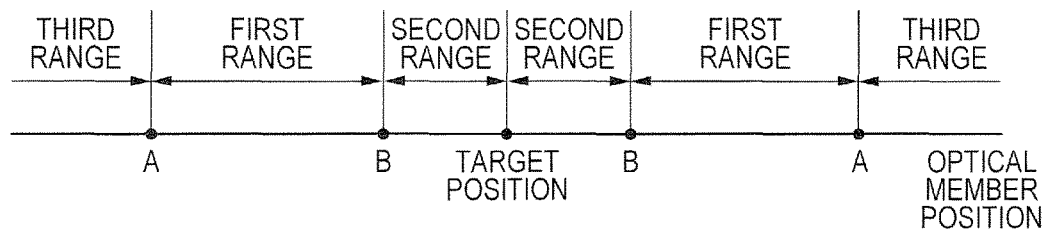
FIG. 9 is a diagram illustrating a relationship among first to third ranges.

Now, the first to third ranges will be described. The relationship among the first to third ranges is illustrated in FIG. 9. The calculator 24 obtains the difference between the target position and the present position at S801, and determines which range the optical member 21 is positioned in, by comparing the difference to predetermined thresholds A and B (a first threshold, and a second threshold). As shown in FIG. 9, when the difference is equal to or smaller than the threshold A (first threshold) and larger than the threshold B (second threshold), the optical member is positioned in the first range. When the difference is equal to or smaller than the threshold B, the optical member is positioned in the second range. When the difference is larger than the threshold A, the optical member is positioned in the third range. The threshold A is set at a position away from a position where the optical member 21 might stop before reaching the target position due to the torque and the orientation difference when the optical member 21 is driven to the target position. The threshold B is set at a position which is closer to the target position than the threshold A, and at which the accuracy required to the optical member 21 can be guaranteed. In the case where the optical member is a focus lens, for example, the threshold B indicates the range where the focus lens is not exactly at the target position but is within the depth of focus, because such a focus error is not recognized and the positioning error is not a problem at all. The threshold B may be set within the depth of focus.

Figure 10:
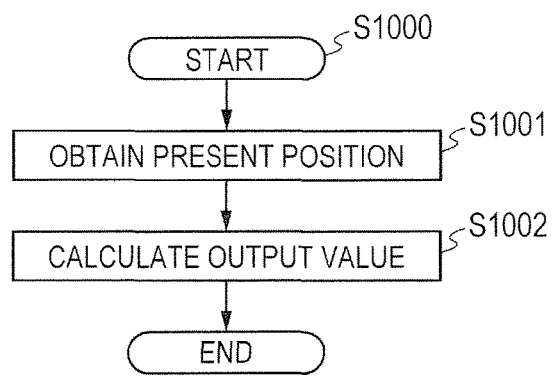
FIG. 10 is a flowchart of a second control.

Next, using a flowchart, descriptions will be provided for a method of calculating the output value for the driver 22 in the second control, the method being performed by the calculator 24. FIG. 10 is a flowchart for the calculation of the output value for the driver 22 in the second control, performed by the calculator 24.

When the calculator 24 detects the position of the optical member 21 is within the second range at S803 in FIG. 8 and proceeds to S804, the process starts and proceeds to S1001.

At S1001, the calculator 24 receives the position of the optical member 21 from the position detector 23. When the calculator 24 receives the present position, the process proceeds to S1002.

At S1002, the calculator 24 calculates the output value for holding the present position. Here, the calculation of the output value for the driver 22 in the second control is terminated.

The output value calculated in the second control is not for driving the optical member to another position, but for preventing the optical member from moving away from the stop position due to the orientation difference, the torque, and the weight of the optical member (for holding the optical member). In other words, it is the same as controlling the driver 22 such that the driver 22 performs a speed control to cause the target value of the driving speed of the optical member to be 0 (zero). Here, the method of calculating the output value to maintain the present position is not particularly limited.

When the difference between the present position and the target position is equal to or smaller than the threshold A (first threshold) and larger than the threshold B (second threshold), the target speed derived by the calculator 24 (speed deriver) is set such that the target speed becomes lower as the difference becomes smaller, and when the difference is equal to or smaller than the threshold B (second threshold), the target speed is set to be 0.

Figure 11:
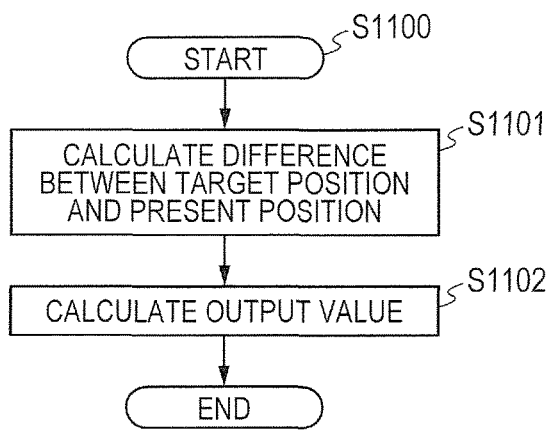
FIG. 11 is a flowchart of a third control.

Next, using a flowchart, descriptions will be provided for a method of calculating the output value for the driver 22 in the third control, performed by the calculator 24. FIG. 11 is a flowchart for calculating the output value for the driver 22 in the third control, performed by the calculator 24.

When the calculator 24 does not detect the position of the optical member 21 is within the second range at S803 in FIG. 8 and proceeds to S805, the process is started and proceeds to S1101.

At S1101, the calculator 24 calculates the difference between the target position stored in the storage 26 and the present position of the optical member 21 detected by the position detector 23. When the calculation is completed, the process proceeds to S1102.

At S1102, the calculator 24 calculates the output value based on the difference calculated at S1101. Here, the calculation of the output value for the driver 22 in the third control is terminated.

Since the third range is positioned away from the target position, it is possible to drive the optical member using position feedback control without considering stopping accuracy, accuracy correction, and the like.

The output value is calculated with the following formula:

$$O = (P1 - P2) \times G,$$

where O is the output value, P1 is the target position, P2 is the present position, and G is the gain. In other words, the output value O is derived as a value proportional to the difference between the target position P1 and the present position P2. As has been described, in this embodiment, by switching the controls depending on the position of the optical member 21, it is possible to provide the lens apparatus including the drive controller with high accuracy without overshooting and hunting even if the control system is not ideal and there are large effects of disturbance.

According to the present invention, it is possible to provide the lens apparatus that causes the driver to drive the optical member, the lens apparatus including the drive controller that enables the driver to drive the optical member to the target position with high accuracy without imposing constraints onto the initialization operation and the driver even if there is a large disturbance.

[Third Embodiment]

Descriptions will be provided for a lens apparatus according to a third embodiment of the present invention. In this embodiment, the basic structure is the same as that in the second embodiment. The third embodiment is the same as the second embodiment in that when the difference between the present position and the target position is equal to or smaller than the threshold A (first threshold) and larger than the threshold B (second threshold), the target speed derived by the calculator 24 (speed deriver) is set such that the target speed becomes lower as the difference becomes smaller, and when the difference is equal to or smaller than the threshold B (second threshold), the target speed is set to be 0. The third embodiment is different from the second embodiment in that setting of the first to third ranges, which are the positions of the thresholds A and B in FIG. 9, can optionally be performed, and the amount of correction of the output value for the driver 22 can optionally be changed. Hereinafter, the difference from the first embodiment and the second embodiment will be described.

The calculator 24 may set the first range based on a result of measuring a deviation of the stop position of the optical member 21 from the drive target position. This surely makes the first control be performed without fail at a position where the optical member 21 might stop due to the torque and the orientation difference.

In addition, the calculator 24 may set the range where the present speed of the optical member 21 is equal to or lower than a prescribed threshold, as the first range. This enables the optical member 21 to follow the target speed smoothly, and also prevents the optical member 21 from stopping before the first control is performed.

In addition, in the case where the optical member as a driven object is a focus lens in FIG. 1, the calculator 24 may set the second range from the F-number of the lens apparatus and the permissible circle of confusion of the camera apparatus 30 including the input apparatus 31. The calculator 24 is able to obtain the depth of focus from the F-number of the lens apparatus and the permissible circle of confusion of the image pickup apparatus.

In general, in the case where the optical member 21 is a focus lens, the smaller the depth of focus is, the higher accuracy is required for the drive control of the target position. For this reason, by making the second range smaller as the depth of focus becomes smaller, it is possible to maintain the optical member 21 at a closer position to the target position. As described above, the configuration may be made such that setting of each range can be performed optionally.

Next, the setting of the amount of correction will be described. The amount of correction is changed to any number by the gain at S404 in FIG. 4. The amount of correction determines trackability to the target speed. If the amount of correction is too large, it would cause overshooting and hunting, and if the amount of correction is too small, it would cause pulsation. Hence, the amount of correction needs to be set appropriately using the gain.

Figure 12:
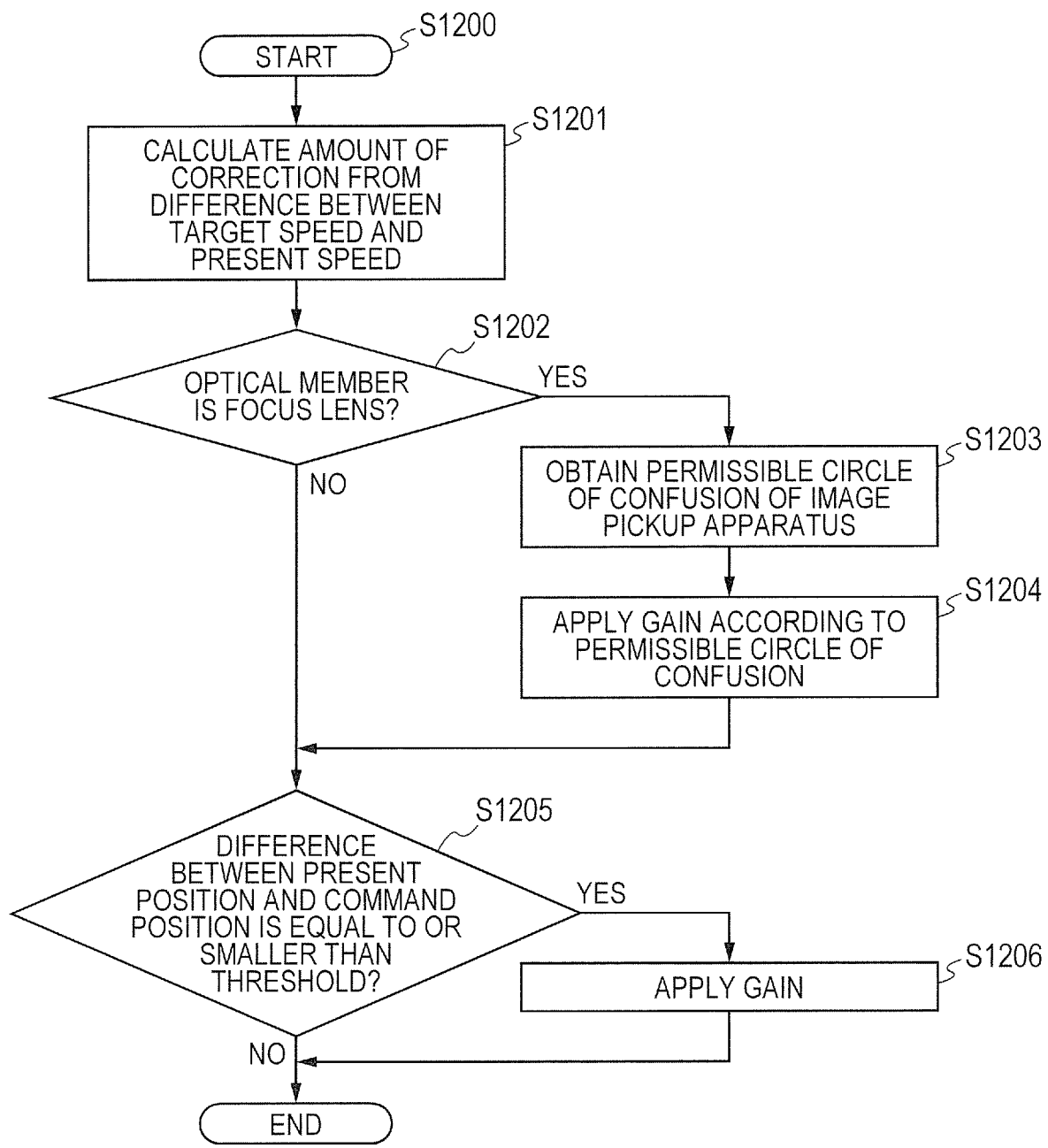
FIG. 12 is a flowchart for applying a gain to the amount of correction.

FIG. 12 is a flowchart for calculation of the amount of correction performed by the calculator 24.

At S1201, the calculator 24 calculates the amount of correction to the present speed, which is necessary to bring the present speed close to the target speed, from the difference between the target speed and the present speed. The final amount of correction is calculated by multiplying the amount of correction calculated here by the gain. After the calculation is completed, the process proceeds to S1202.

At S1202, the calculator 24 determines via the communicator 25 whether or not the optical member 21 is a focus lens. In the case where the optical member 21 is a focus lens, the process proceeds to S1203. In the case where the optical member 21 is not a focus lens, the process proceeds to S1205.

At S1203, the calculator 24 receives information on the permissible circle of confusion via the communicator 25. After the reception, the process proceeds to S1204.

At S1204, the calculator 24 multiplies the amount of correction calculated at S1201 by a gain based on the size of the permissible circle of confusion. The relationship between the size of the permissible circle of confusion and the amount of correction will be described later with reference to FIG. 13. After the gain is applied, the process proceeds to S1205.

At S1205, the calculator 24 determines whether the difference calculated at S1201 is equal to or lower than the threshold. If the difference is larger than the threshold, the process proceeds to S1206. If the difference is equal to or smaller than the threshold, the calculation of the amount of correction is terminated.

At S1206, the calculator 24 multiplies the amount of correction by the gain. Descriptions will be provided later for how to apply the gain depending on the position of the optical member 21. After the gain is applied, the calculation of the amount of correction is terminated.

Here, the configuration may be made such that the permissible circle of confusion at S1203 and the threshold for the difference at S1205 can be set optionally.

The trackability to the target speed of the optical member 21 becomes higher as the amount of correction becomes smaller. This makes it possible to achieve the highly accurate drive control of the optical member 21. On the other hand, if the amount of correction is large, it is possible to shorten the time taken to reach the target speed.

Figure 13:
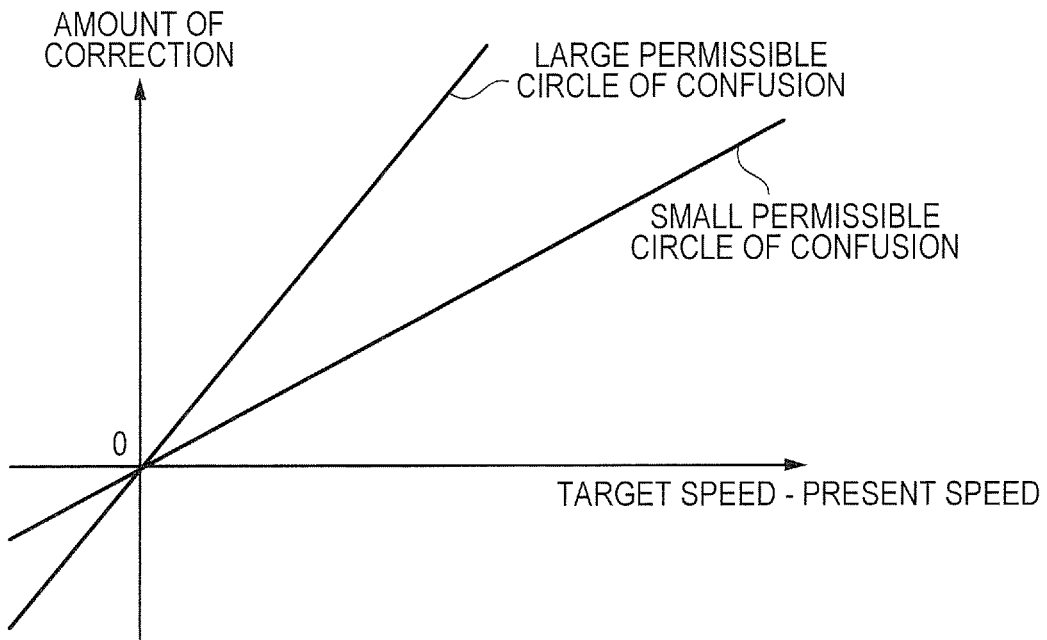
FIG. 13 is a graph illustrating a relationship between the amount of correction and a permissible circle of confusion.

Here, descriptions will be provided for the relationship between the permissible circle of confusion and the amount of correction. FIG. 13 is a graph illustrating the amount of correction when a permissible circle of confusion is large and when it is small. The optical member requires a higher stopping accuracy for the target position as the permissible circle of confusion of the image pickup apparatus becomes smaller. Accordingly, at S1204, when the permissible circle of confusion is small, the gain is applied such that the amount of correction is small, as illustrated in FIG. 13.

Figure 14:
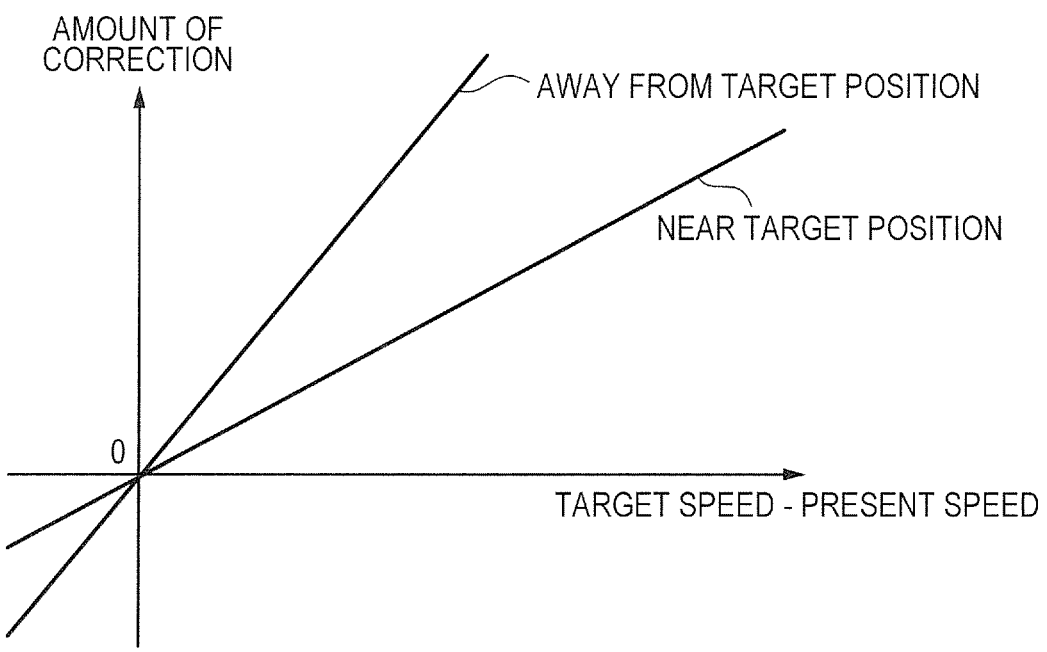
FIG. 14 is a graph illustrating a relationship between the amount of correction and a position of an optical member.

Next, descriptions will be provided for how to apply the gain depending on the position of the optical member 21. FIG. 13 is a graph indicating the amount of correction when the position of the optical member is close to the target position and when it is far from the target position. In close proximity to the target position, the gain is applied at S1206 such that the amount of correction is small, in order to enhance the trackability to the target speed, as illustrated in FIG. 14.

As described above, when the permissible circle of confusion is small, or when the optical member 21 has come close to the target position, the calculator 24 decreases the gain to enhance the trackability to the target speed and makes it possible to perform control without overshooting and hunting.

As described above, in this embodiment, it is possible to provide the lens apparatus including the efficient and highly accurate drive controller that sets the amount of correction for the first to third ranges in detail.

According to the present invention, it is possible to provide the lens apparatus that causes the driver to drive the optical member, the lens apparatus including the drive controller that enables the driver to drive the optical member to the target position accurately and efficiently without imposing constraints onto the initialization operation and the driver. In addition, with the image pickup apparatus including the lens apparatus described above and the camera apparatus with the image pickup element that receives a subject image formed by the lens apparatus, it is possible to achieve an image pickup apparatus that provides the advantageous effects of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-256004, filed Dec. 28, 2015, which is hereby incorporated by reference herein in its entirety.

What is claimed is:

1. A lens apparatus comprising:
an optical member;
an actuator configured to move the optical member;
a position detector configured to detect a position of the optical member; and
a processor configured to:
   set a target position to which to move the optical member;
   obtain a target speed of the optical member based on a difference between the target position and the position of the optical member; and
   control the-actuator based on the target speed,
wherein,
in a case where the difference is not larger than a first threshold and larger than a second threshold, the processor is configured to obtain an output value for the actuator based on a difference between the target speed and a speed of the optical member, and
in a case where the difference is not larger than the second threshold, the processor is configured to obtain the output value for the actuator with which the position of the optical member is not changed.

2. The lens apparatus according to claim 1, wherein, in a case where the difference is larger than the first threshold, the processor is configured to obtain the output value for the actuator such that the output value is proportional to the difference, the first threshold having been set based on a deviation of a stop position of the optical member from a target stop position of the optical member, the deviation caused by the actuator controlled by the processor in accordance with the output value proportional to the difference.

3. The lens apparatus according to claim 1, wherein, in a case where the difference is larger than the first threshold, the processor is configured to obtain the output value for the actuator such that the output value is proportional to the difference, the first threshold having been set based on a position of the optical member where a speed of the optical member becomes a speed not greater than a prescribed threshold.

4. The lens apparatus according to claim 1, wherein the optical member is a focus lens, and
the processor is configured to set the second threshold based on an F-number of the lens apparatus and a permissible circle of confusion of an image pickup apparatus to which the lens apparatus is connected.

5. The lens apparatus according to claim 1, wherein the processor is configured to change, in a case where the difference is not larger than the first threshold and larger than the second threshold, a gain for obtaining the output value based on a permissible circle of confusion of an image pickup apparatus to which the lens apparatus is connected.

6. The lens apparatus according to claim 1, wherein the processor is configured to change, in a case where the difference is not larger than the first threshold and larger than the second threshold, a gain for obtaining the output value based on the difference.

7. An image pickup apparatus comprising:
a lens apparatus including:
   an optical member;
   an actuator configured to move the optical member;
   a position detector configured to detect a position of the optical member; and
   a processor configured to:
      set a target position to which to move the optical member;
      obtain a target speed of the optical member based on a difference between the target position and the position of the optical member; and
      control the actuator,
   wherein,
   in a case where the difference is not larger than a first threshold and larger than a second threshold, the processor is configured to obtain an output value for the actuator based on a difference between the target speed and a speed of the optical member, and
   in a case where the difference is not larger than the second threshold, the processor is configured to obtain the output value for the actuator with which the position of the optical member is not changed; and
an image pickup element configured to receive light of an image formed by the lens apparatus.

* * * * *